United States Patent [19]

Carvalho

[11] 4,186,525
[45] Feb. 5, 1980

[54] REMOVABLE CLOSURE PANEL AND RELEASABLE SPRING HINGE MEANS THEREFOR

[75] Inventor: Elmer R. Carvalho, Claremont, Calif.

[73] Assignee: D G Shelter Products Company, City of Industry, Calif.

[21] Appl. No.: 899,111

[22] Filed: Apr. 24, 1978

[51] Int. Cl.² ............................................. E05C 21/02
[52] U.S. Cl. ........................................ 49/465; 49/383; 49/394; 296/137 B
[58] Field of Search ............... 296/137 B; 292/263, 292/DIG. 49; 49/356, 463, 465, 394, 383

[56] References Cited

U.S. PATENT DOCUMENTS

| 3,972,558 | 8/1976 | Horn | 296/137 B |
| 3,974,753 | 8/1976 | Blomgren et al. | 296/137 B |

Primary Examiner—Kenneth Downey
Attorney, Agent, or Firm—Poms, Smith, Lande & Rose

[57] ABSTRACT

A readily removable closure panel for an opening in a roof or wall of a vehicle and including a quick release hinge means for permitting partial opening of the panel and for rapid disengagement and removal of the panel from the roof. An adjustable hinge construction for a panel wherein the hinge construction includes a resilient yieldable hinge member which provides a hinge edge for releasable pivotal engagement with a cooperable frame portion of a frame member defining an opening in the roof. The hinge edge engagement provides a hinge axis beneath or interiorly of the panel margin and the hinge edge is adjustably spaced therefrom for causing the panel edge margin to press against a resilient gasket on the frame member in both closed and partially opened position of the panel.

9 Claims, 9 Drawing Figures

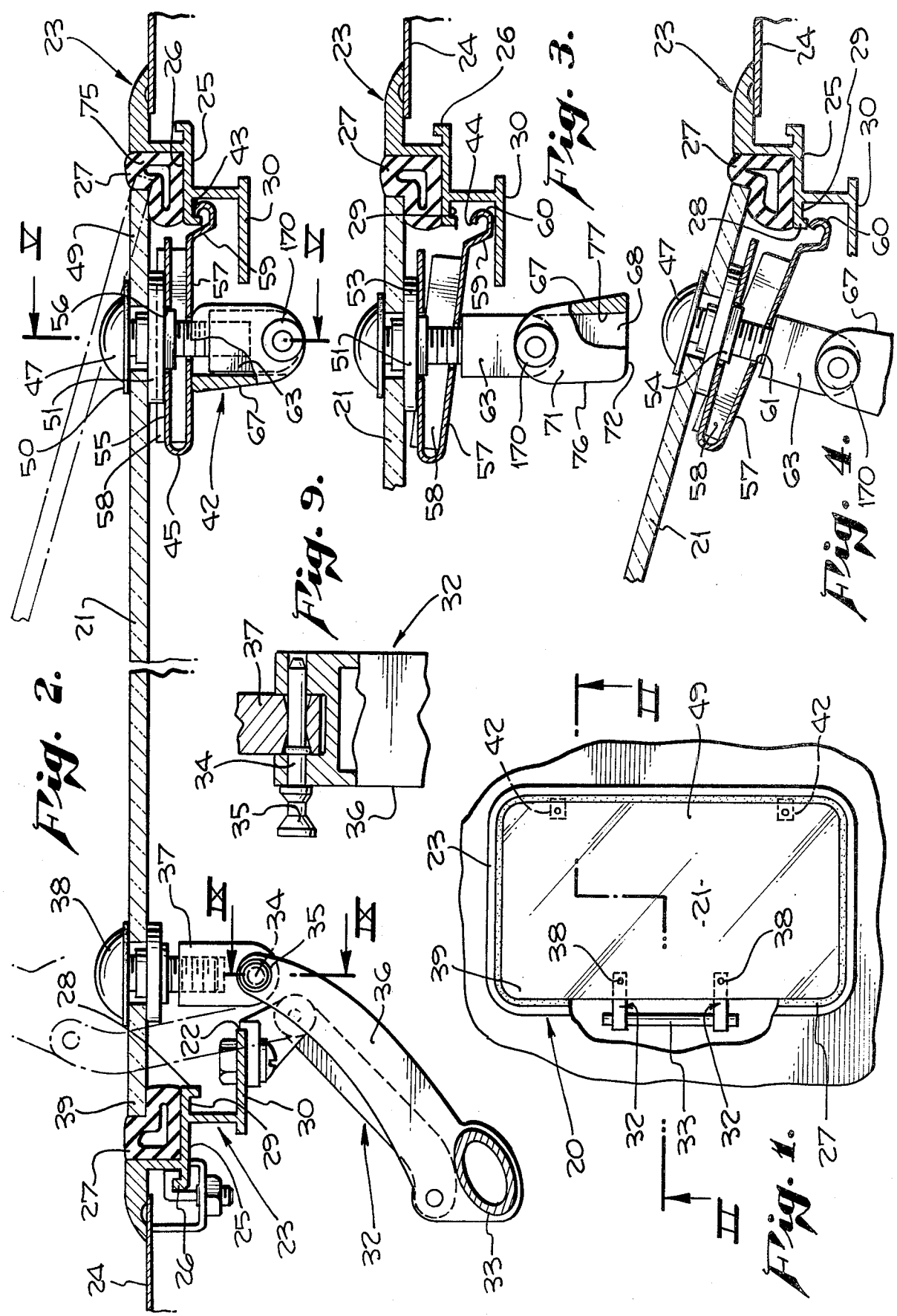

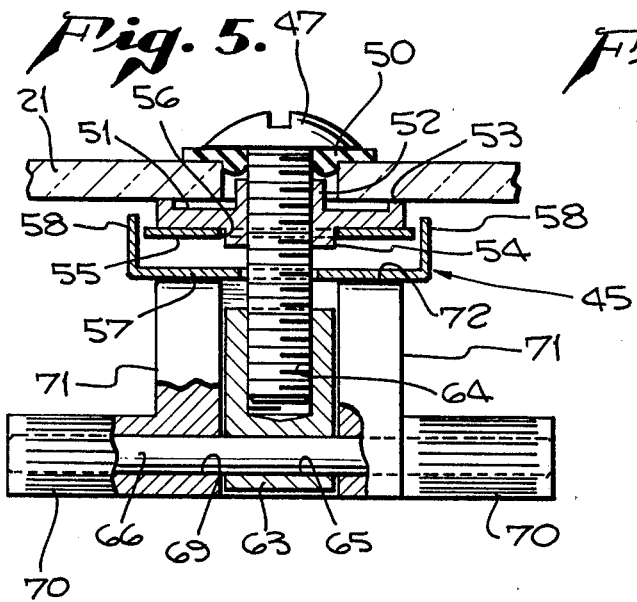
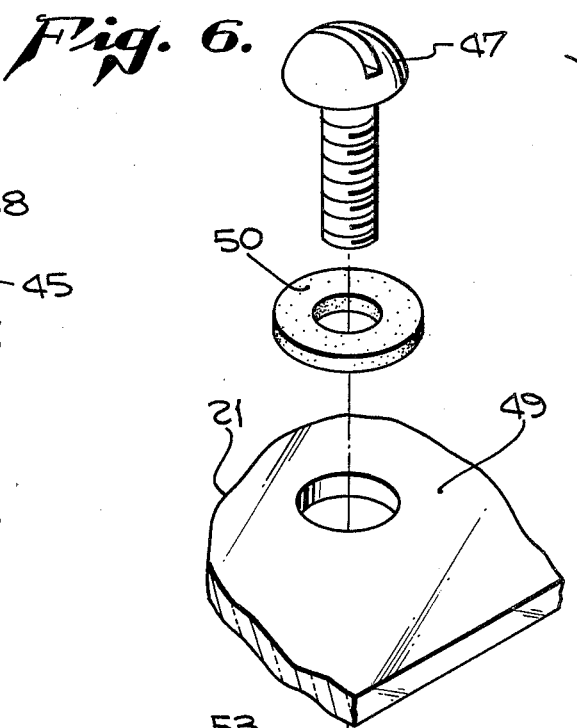
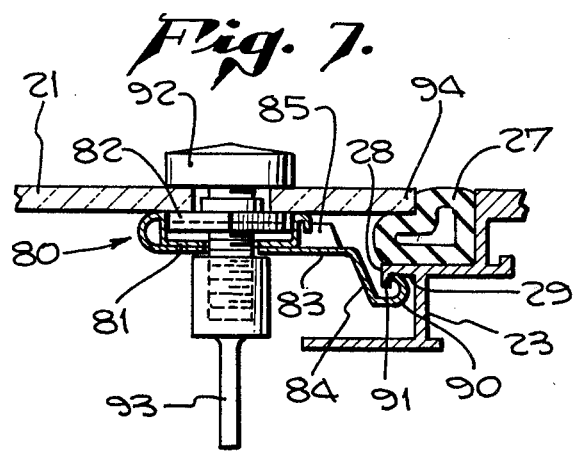
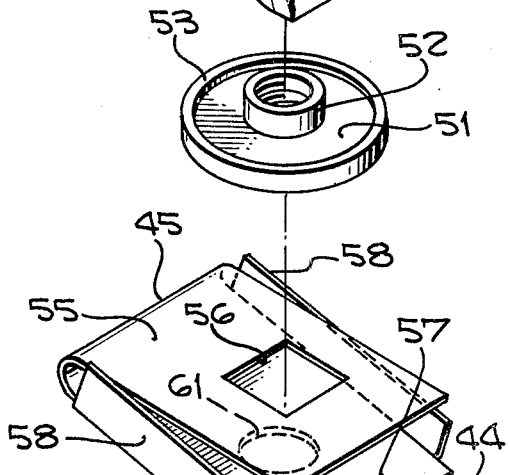
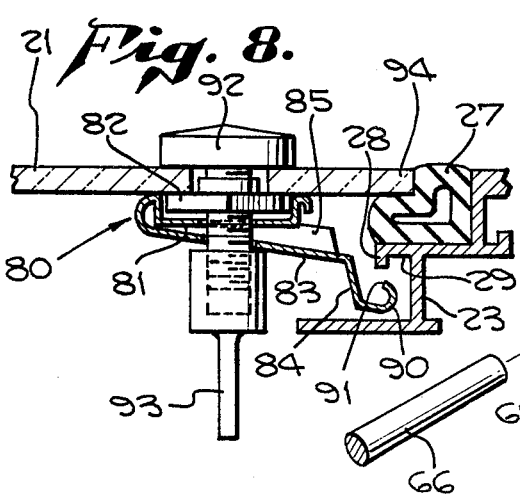
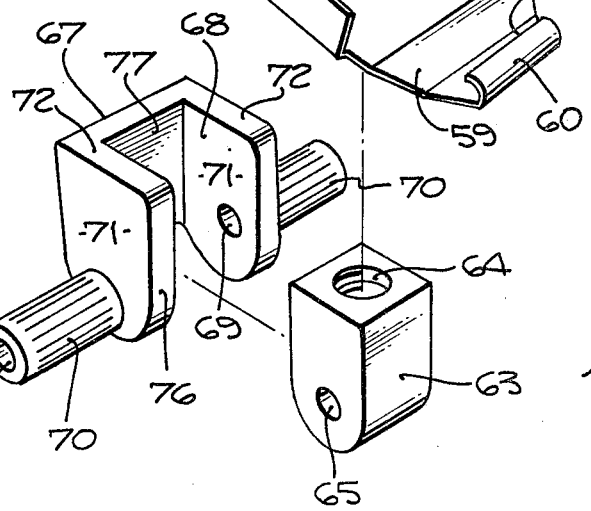

REMOVABLE CLOSURE PANEL AND RELEASABLE SPRING HINGE MEANS THEREFOR

BACKGROUND OF INVENTION

In general, prior proposed closure panels for vehicle roofs on passenger cars, vans, recreational vehicles, and the like have included sliding panels, hinged non-removable panels for partial opening of the panel, and hinged panels adapted to be locked in partial opened position and adapted to be completely disengaged with the roof to provide an unobstructed roof opening. In the latter type of closure panel, which concerns the present invention, the location of the hinge axis and the maintenance of suitable pressure on gasket material against which edge margins of the panel bears is very important. Ease of removal and disassembly from the vehicle is desirable.

In one prior proposed construction of such a closure panel, an exterior hinge having an exterior hinge axis was provided, the hinge construction including a T-shaped hinge element provided with an opening in the widened stem of the T which received a tab provided on a frame member of the opening. The extensions of the T provided pivot elements engaged with a frame member. Disengagement of the T-hinge element, when it was desired to remove the panel from the roof, was difficult because disassembly of the T-hinge element with the tab required further pressure against the adjacent resilient gasket on the frame member and such pressure resisted disassembly of the hinge with the frame member. Further, in such prior proposed hinge construction, when the closure panel was partially opened, the sealing pressure against the gasket was decreased because of the location of the hinge axis. Such prior proposed hinge means for a closure panel on a vehicle roof included disadvantages of rattling when partially opened because of wind resistance and insufficient pressure against a resilient sealing gasket, no adjustment was provided for securing desired pressure against the resilient gasket in such partial opened position, and disengagement of the hinge means with the roof frame member was difficult and not quickly, readily accomplished.

SUMMARY OF THE INVENTION

The present invention relates to a closure panel for an opening in the roof of a vehicle wherein the disadvantages of prior proposed closure panel and hinge constructions known to me are avoided. The invention particularly relates to a readily removable closure panel having disengageable latch means and hinge means for complete removal of the panel from an opening. The invention particularly relates to a novel hinge construction providing quick, rapid disengagement of the panel from the roof.

The present invention contemplates a closure panel adapted to be secured in tightly sealed closed relation to an opening in a roof or a wall, the panel being movable about an axis interiorly of the panel and held in partially opened relation to the opening, if desired. The closure panel of the invention is also readily detachable from the frame means defining the opening in the wall. The invention contemplates that such disassembly of the closure panel with respect to the roof and likewise the assembly of the panel with the roof may be quickly and readily accomplished without difficulty.

The invention contemplates a closure panel provided with a novel hinge construction connected to the edge margin of a panel which is seated on a resilient gasket material carried by a frame member, and the location of a hinge edge relative to the edge margin whereby pressure of the edge margin against the gasket material is enhanced when the closure panel is in partial opened position. The hinge construction of this invention includes adjustment means for varying the space between the hinge edges and the edge margin of the panel whereby desired compression of the resilient gasket material is obtained and wherein the hinge construction includes means for easily and quickly expanding the space between the hinge edge and the edge margin of the panel for quick disassembly or assembly of the panel with the frame member.

The primary object of the present invention therefore is to provide a closure panel for a roof opening in a vehicle or the like which may be readily disassembled or assembled with respect to the roof opening and which may be opened to a partial rattle-free open position.

An object of the present invention is to provide a novel hinge means for use with such a closure panel and roof of a vehicle wherein the hinge means provides adjustment of pressure imposed upon resilient gasket material carried by a frame member defining edges of the opening in the roof.

Another object of the invention is to provide a novel hinge construction wherein a resilient yieldable hinge member is provided for engagement with the frame member of the roof or wall of the vehicle.

A further object of the invention is to provide a hinge means as mentioned above in which the hinge member is a folded spring element held under selected compression in assembly with a panel and a roof frame member and readily expandable to relieve such compression to permit ready disengagement of the hinge member from the frame member.

A still further object of the present invention is to provide a hinge means having a resilient yieldable hinge member provided with a knife-edge at its extremity which cooperates with the frame member to provide a hinge axis for pivotal movement of the closure member.

A more specific object of the present invention is to provide a novel hinge means having a resilient yieldable spring hinge member cooperable with a frame member of a roof opening to provide a hinge axis inside a vehicle and wherein cam means are provided for quickly positioning the spring member in preadjusted position with respect to a panel edge margin, the cam means being readily pivoted to provide quick release of the hinge means from the frame member.

Various other objects and advantages of the present invention will be readily apparent from the following description of the drawings in which exemplary embodiments of the invention are shown.

IN THE DRAWINGS

FIG. 1 is a fragmentary top plan view of a closure panel covering an opening in a roof or wall, a portion of the roof being broken away, and embodying this invention.

FIG. 2 is an enlarged sectional view of the closure panel and roof shown in FIG. 1, the section being taken in the planes indicated by line II—II of FIG. 1.

FIG. 3 is a partial fragmentary sectional view of the hinge means of this invention shown at the right of FIG. 2, the hinge means being in relaxed position.

FIG. 4 is a fragmentary sectional view of the hinge means shown in FIG. 3 illustrating disengagement of the hinge means with the frame defining the opening in the roof or wall.

FIG. 5 is an enlarged fragmentary sectional view taken in the plane indicated by line V—V of FIG. 2.

FIG. 6 is an enlarged exploded perspective view of the hinge means shown in FIG. 2.

FIG. 7 is a fragmentary sectional view of a different modification of the hinge means of this invention.

FIG. 8 is a fragmentary sectional view illustrating the hinge means of FIG. 7 in relaxed or open position.

FIG. 9 is a fragmentary sectional view taken in the plane indicated by line IX—IX of FIG. 2.

A closure means generally indicated at 20, FIG. 1, may include a closure panel 21 adapted to cover a generally rectangular opening 22 defined by a peripheral frame member 23 secured to a roof 24 or wall of a vehicle in suitable manner. While this invention is described with respect to a vehicle, such as a recreational vehicle, van, motor home or passenger vehicles, it will be understood that the closure means may be utilized to cover any opening in a wall where a partial opening is desired and also where the entire closure panel may be removed to provide an unobstructed opening in the wall. In this example the closure panel is illustrated as made of glass, although other materials may be used, such as plastic, metal, etc.

The peripheral frame means 23 includes a selected extrusion having a cross sectional shape which includes an intermediate flange portion 25 providing an outwardly facing supporting surface 26 upon which may seat a peripheral gasket 27 of suitable resilient yieldable configuration. Intermediate flange 25 includes a downturned lip 28 on its inner periphery to define a recess 29 for a purpose later described. Frame member 23 also includes a bottom inwardly extending flange portion 30, the inner peripheral edge of which defines opening 22. Flange 30 provides support for a toggle-type latch means generally indicated at 32 of a type described and claimed in copending application Ser. No. 813,502 owned by a common assignee.

Latch means 32 is only generally illustrated and includes a crossbar 33 by which the closure panel 21 may be raised and locked in partially open position as illustrated by phantom lines in FIG. 2. As shown in FIG. 9, latch means 32 includes a removable pivot pin 34 which may be readily removed by grasping enlarged end 35 thereof to release the end of link 36 from the adjustable threaded block 37 which is carried by a bolt assembly 38 connected to the panel 21. As described in said application, pin 34 may be removed to permit threaded adjustment of block 37 with respect to bolt 38 to vary the pressure of the margin 39 of panel 21 on the gasket material 27. Removal of pin 34 also releases that side of panel 21 from the frame means 23.

In spaced relation along the opposite side of panel 21 are hinge means 42 which embody this invention and which permit limited pivotal movement of panel 21 about a hinge axis or hinge edge at 43 as provided by the downturned lip 28 on the interior of recess 29 and the edge 44 of a spring hinge member 45. Hinge means 42 may comprise a bolt 47, which extends through margin 49 of panel 21, a washer 50 being interposed between the head of bolt 47 and the top surface of panel 21.

Washer 50 may be made of neoprene foam material. Beneath panel 21 an insulating molded washer 51 is provided, washer 51 having a threaded hub 52 for threaded engagement with bolt 47 to secure bolt 47 and to compress neoprene washer 50 between the bolt head and the panel 21. Washer 51 may have an annular lip 53 for pressure engagement against the undersurface of panel 21. On the bottom side of washer 51 a polygonal boss or square-shaped projection 54 is provided for positioning engagement with the hinge spring member 45 as later described.

Hinge member 45, in this example, includes a folded leaf spring having a top leaf portion 55 provided with a polygonal or square opening 56 to receive the correspondingly shaped boss 54 on washer 51 to orient and position the spring member in relation to the bolt and the frame means 23. A bottom leaf portion 57 is folded under the upper leaf portion 55, the leaf portions 55 and 57 being normally angularly divergingly related in relaxed condition. Lower leaf portion 57 is provided with upstanding side walls 58 which rigidify the lower leaf portion against bending along its length, the side walls 58 being spaced apart to receive therebetween the upper leaf portion 55 in its folded relation. Lower leaf portion 57 includes a downwardly offset end portion 59 terminating in an upwardly and inwardly directed hook portion 60 which provides the knife or hinge edge 44 for engagement with the interior surface of the downturned lip 28 on the frame means 23. Lower leaf portion 57 is provided with the hole 61 for reception of the shank of bolt 47.

A connector block 63 is provided with a threaded bore 64 for threaded adjustable engagement with the threaded shank of bolt 47. Connector block 63 is provided with a throughbore 65 for reception of a connector pin 66 for connecting a cam member 67 to the connector block 63.

Cam member 67 may be of U shape to provide an opening 68 to receive connector block 63 with bore 65 in alignment with coaxial bores 69 provided in knurled finger engageable extensions 70. The height of walls 71 of cam member 67 in relation to the common axis of bores 69 and 65 when assembled therewith is greater than the height of connector block 63 so that block 63, together with the cam member, may be threaded on bolt 47 to bring the top edges 72 of cam member 67 into contact with the bottom surface of leaf portion 57 of the hinge member 45. As the connector block 63 is threaded on bolt 47, the leaf portions 55 and 57 will be urged towards each other; and when the hook portion 60 is positioned under lip 28 of the frame member, the edge of margin 49 of the panel 21 will be urged against the gasket material 27. Since gasket material 27 is supported on surface 26 and the hinge edge is bearing against the bottom surface of flange portion 25 at the downturned lip 28, the compressive forces of the gasket material 27 and of the hinge member 45 provide a resilient hinge connection for that side of the closure panel 21.

Adjustment of the pressure of the margins of the panel 21 against the peripheral gasket material 27 is readily made by adjustably threading the block 37 of the latch means on its bolt 38 and adjustable threading of the connector block 63 on its bolt 47. The block 37 of the latch means is adjustable with the pin 34 removed as described in the aforesaid copending application and the adjustment of connector block 63 on the thread of bolt 47 is made until the hinge hook portion 60 of the spring member 45 is securely resiliently seated in the recess 29 of the frame member.

When it is desired to position the closure panel 21 in partially opened position by extending the latch means 32, such extension of the latch means will raise the closure panel to approximately the angle shown by phantom lines in FIG. 2. In this open angular position of closure panel 21, it will be apparent in FIG. 2 that the edge of panel margin 49 has moved somewhat to the right as shown in FIG. 2 to further compress the gasket material 27 between the edge of margin 49 and the surface 75 of the peripheral frame member 23. In partially opened position, the gasket material is compressed to a greater degree than in normally closed position; and thus, there is no rattling or shaking of the closure panel due to the action of wind forces in such partially opened position. In such position, it should be noted that the offset portion 59 permits movement of the hinge hook portion 60 about the lower edge of the lip 28 and interference therewith is avoided.

When it is desired to remove panel 21 from the framed opening, pins 34 of the latch means 32 may be readily removed to release the latch means from its connection to the block 37. Hinge means 42 is released by placing a finger behind cam member 67 and against the edges 76 of the side walls 71 thereof to rotate cam member 67 about pin 66 to thereby permit the lower leaf portion 57 to move downwardly as shown in FIG. 3. In such release down position of leaf portion 57, the hook portion 60 may be disengaged from the recess 29. Upon such disengagement, panel 21 may be moved to the left as shown in FIG. 3 so that the hook portion will clear lip 28 as partially indicated in FIG. 4, as the panel is being lifted upwardly and angularly inclined rearwardly so that the hook portion 60 clears lip 28. Release of the cam member 67 and the expansion of the leaf portions 55, 57 widens the distance between the edge of panel margin 49 and the hinge edge 44 of the hook portion 60 and thereby permits ready separation of that side of the panel 21 from the frame means.

When the panel 21 is separated it may be stored as desired after replacing the pin 34 in its link 36. It will be apparent that the assemblies associated with bolt 38 and 47 remain intact with the panel and thereby permit reassembly of the panel with the frame means without loss of parts.

If desired, the internal surface 77 of the cam member 67 may be painted a bright red to signal to the operator of the vehicle that the hinge means 42 is in open position ready for disassembly. In cam locked position, as shown in FIG. 2, the red surface 77 is not visible and the vehicle operator can tell at a glance that the hinge means is in hinged assembly with the frame means.

In FIGS. 7 and 8, a different modification of the hinge means is illustrated. In this embodiment, hinge member 80 is provided with an upper leaf portion 81 having a polygonal configuration to engage molded washer 82 to orient the spring member 80 with the frame means 23 and to maintain such position therewith. Lower leaf portion 83 includes a similar downwardly extending offset portion 84 provided with a hook portion 90 having a hinge edge 91 for engagement with lip 28 within the recess 29 as in the prior embodiment. Hinge member 80 also includes walls 85 along edges of lower leaf portion 83 which may receive therewithin upper leaf portion 81. Hinge member 80 is carried beneath panel 21 by a bolt 92 and is compressed by a wing nut 93 threaded on bolt 92.

In assembled position with frame means 23, the hinge member 80 may be selectively compressed by wing nut 93 so the distance between edge 94 of panel 21 and hinge edge 91 of hook portion 90 of the hinge member is such that gasket material 27 will be maintained under compression and disassembly of the panel with the frame member in partially opened position will not occur.

In FIG. 8, wing nut 93 is shown retracted by partially unthreading nut 93 on bolt 92 to permit lower leaf portion 83 to expand and separate from upper leaf portion 81 and thereby permit hook portion 90 of the hinge member 80 to be disengaged from recess 29 as in the prior embodiment of the invention.

While the examples of the invention show bolts serving as securement members to the glass panel, other securement means may be used with other panels. Present glass panels may be made of tempered glass and of slightly curved or bowed shape to assist in a firm uniform sealing peripheral contact of its edge margins with the gasket material. Two examples of releasable securing means for the hinge means are shown, namely, the adjustable block with cam member and the wing nut. Other types of releasable securing means may be used which will permit adjustment of the space between the hinge edge and the edge margin of the panel for maintaining a hinge axis and selected compression of the gasket material.

I claim:
1. A hinge construction for a panel serving as a removable closure for an opening defined by a frame having support surfaces for edge margins of said panel and resilient compressible gasket means between said edge margins and said support surfaces, comprising in combination:
   means providing a recess on said frame defined by a downwardly directed lip beneath said support surfaces;
   a securement means extending through the panel edge margins in lateral spaced relation to said recess means;
   leaf spring means carried by said securement means and having a spring edge portion receivable in said recess for hinging relation therewith in one position;
   and means adjustable on said securement means and adapted to contact said spring means for moving said spring means into said hinged relation with said recess means in said one position and for releasing said spring means in another position.
2. A hinge construction as stated in claim 1 wherein said securement means includes a bolt having a threaded portion,
   and said adjustable means includes a nut means threaded on said bolt threaded portion.
3. A hinge construction as stated in claim 2 wherein said nut means is provided with a cam member pivotally mounted thereon for camming said leaf spring means into hinging relation with said recess means.
4. A hinge construction as stated in claim 1 wherein said spring edge portion includes a hook shaped hinge section.
5. A hinge construction as stated in claim 1 wherein said spring means is a folded leaf spring member having leaf spring elements extending alongside each other;
   one of said leaf spring elements having a configuration cooperable with said securement means for orienting said spring means.

6. A hinge construction as stated in claim 5 wherein the other of said leaf spring elements is provided with said spring edge portion;

said leaf spring means being maintained under compression by said adjustable means for retaining said hinging relation and for compressing said gasket means by panel edge margins.

7. A hinge construction as stated in claim 5 wherein said other leaf spring element is provided with longitudinally extending ribs for restricting flexure of said leaf spring element along a major portion of its length.

8. A hinge construction as stated in claim 1 wherein said adjustable means includes a cam member pivotally mounted thereon for engagement with said other of said leaf spring elements for stressing said leaf spring means to maintain hinge relationship with said recess means.

9. A hinge construction as stated in claim 8 wherein said pivotally mounted cam member on said adjustable means is movable into a position to release said leaf spring element from its stressed condition and to release said hinged relation.

* * * * *